(No Model.) 6 Sheets—Sheet 1.

D. MAXWELL.
HARVESTER BINDER.

No. 364,837. Patented June 14, 1887.

Witnesses.
Inventor.
His Attorneys.

(No Model.)  D. MAXWELL.  6 Sheets—Sheet 2.
HARVESTER BINDER.
No. 364,837.  Patented June 14, 1887.

Fig. 2.

Witnesses.
Chas. R. Burr
A. G. Stuart

Inventor.
David Maxwell
by Church & Church
His Attorneys.

(No Model.) 6 Sheets—Sheet 3.

D. MAXWELL.
HARVESTER BINDER.

No. 364,837. Patented June 14, 1887.

Fig. 3.

Witnesses.
Chas. R. Bull
A. J. Stewart

Inventor.
David Maxwell
by Church & Church
His Attorneys.

(No Model.) 6 Sheets—Sheet 4.

D. MAXWELL.
HARVESTER BINDER.

No. 364,837. Patented June 14, 1887.

Witnesses
Chas. R. Burr
A. S. Stewart

Inventor
David Maxwell
by Church & Church
His Attorneys.

UNITED STATES PATENT OFFICE.

DAVID MAXWELL, OF PARIS, ONTARIO, CANADA.

HARVESTER-BINDER.

SPECIFICATION forming part of Letters Patent No. 364,837, dated June 14, 1887.

Application filed September 12, 1885. Serial No. 176,928. (No model.) Patented in Canada October 23, 1885, No. 22,679.

*To all whom it may concern:*

Be it known that I, DAVID MAXWELL, of Paris, in the Province of Ontario, Canada, have invented certain new and useful Improvements in Harvester-Binders; and I do hereby declare the following to be a full, clear, and exact description of the same, reference being had to the accompanying drawings, forming a part of this specification, and to the figures and letters of reference marked thereon.

The design of my present invention, considered as a unit, is the production of an improved harvester-binder of relatively light weight and draft, adapted to operate in a practical and efficient manner upon grain in all the various conditions in which it is found, whether standing or lodged, and provided with the requisite mechanisms for controlling the height of the cutters and the position of the reel, so that the driver can from his seat and with comparatively little labor effect the desired adjustments while the machine is in motion.

The particular class of harvesters to which my said invention is shown as applied, and to which it is especially adapted, is of the one-wheel elevator type, wherein the major portion of the frame-work is supported upon a single main drive-wheel whose axle rests in bearings on the main frame or truck at the outer or stubble side, while the inner end of the platform, or that nearest the standing grain, is supported in part upon a grain-wheel whose adjustable axle is located in substantially the same vertical plane as the axle of the main drive-wheel. The platform attached at its outer end to the main frame is provided with the usual endless apron or slatted canvas upon which the grain falls after being cut, and is delivered between the lower rollers of two traveling aprons constituting the elevator which serves to carry the grain upward and over the main drive-wheel and deliver it upon the binding-table, and in position to be acted upon by the binding mechanism.

Machines of this class have heretofore been constructed; hence I do not wish to be understood as claiming, broadly, such combination of parts, my present invention being restricted to certain improvements made thereon and to be hereinafter described, whereby certain defects in the construction and operation of such machines have been overcome or obviated and the size and weight of the machine reduced without in any degree diminishing its capacity or effective operation, but, on the contrary, producing a marked improvement therein. The improvements made, and which enter into the composition of the said machine, relate not only to the construction and arrangement of the main frame, platform, and elevating and binding mechanisms, considered separately and in their combination, but also to the tongue-tilting mechanism, the arrangement of the reel, and of its driving and adjusting devices, the several members being so combined and arranged with relation to each other and their co-operating parts as to produce an improved harvester-binder, such as is hereinafter more fully described, the novel features whereof are specifically pointed out in the claims.

In the accompanying drawings, wherein my said improvements are illustrated.

Similar letters in the several figures denote the same parts.

Figure 1:
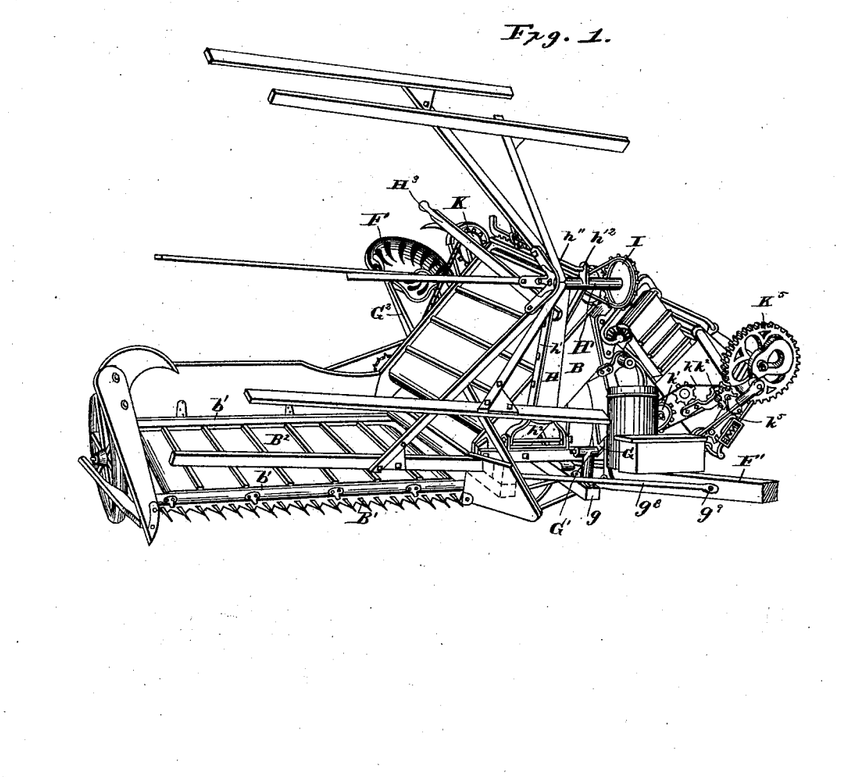
Figure 1 is a front view in perspective.
Figure 2:
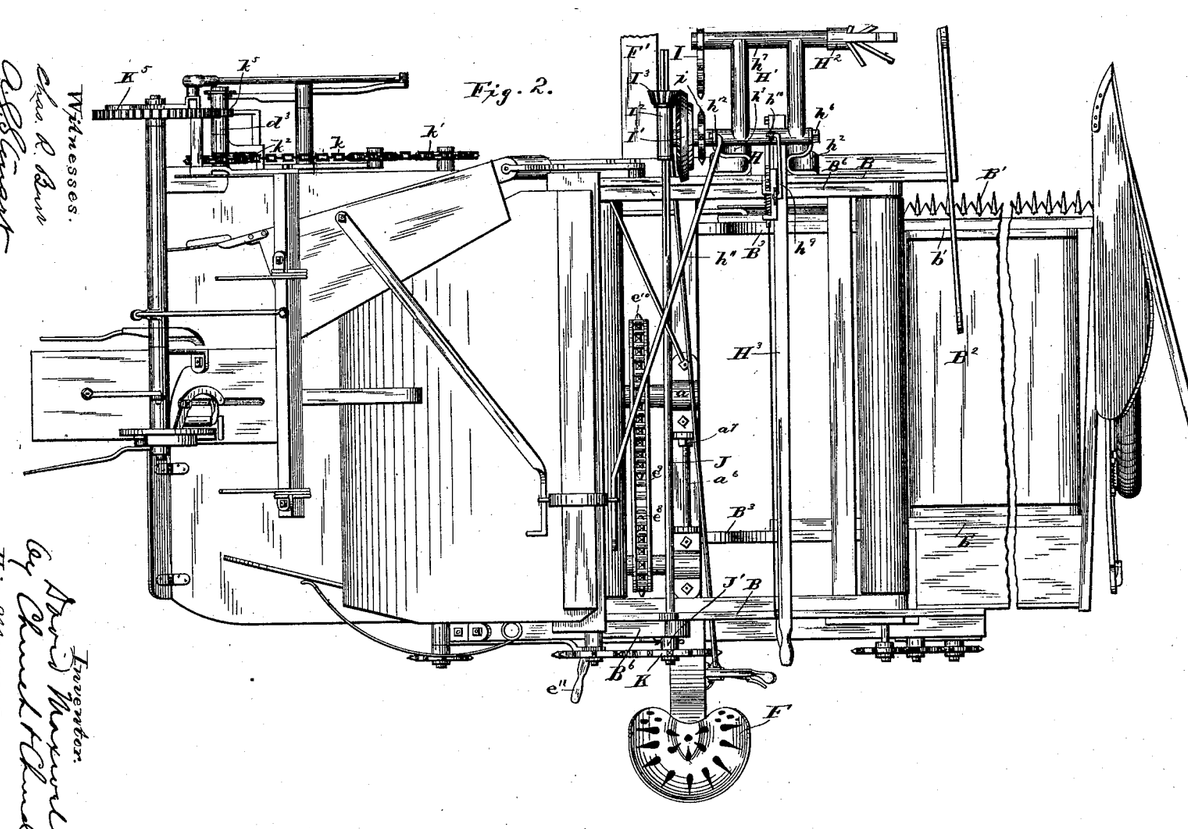
Figs. 2 and 3 are top and rear plan views, respectively, of a harvester-binder with my improvements applied thereto.
Figure 3:
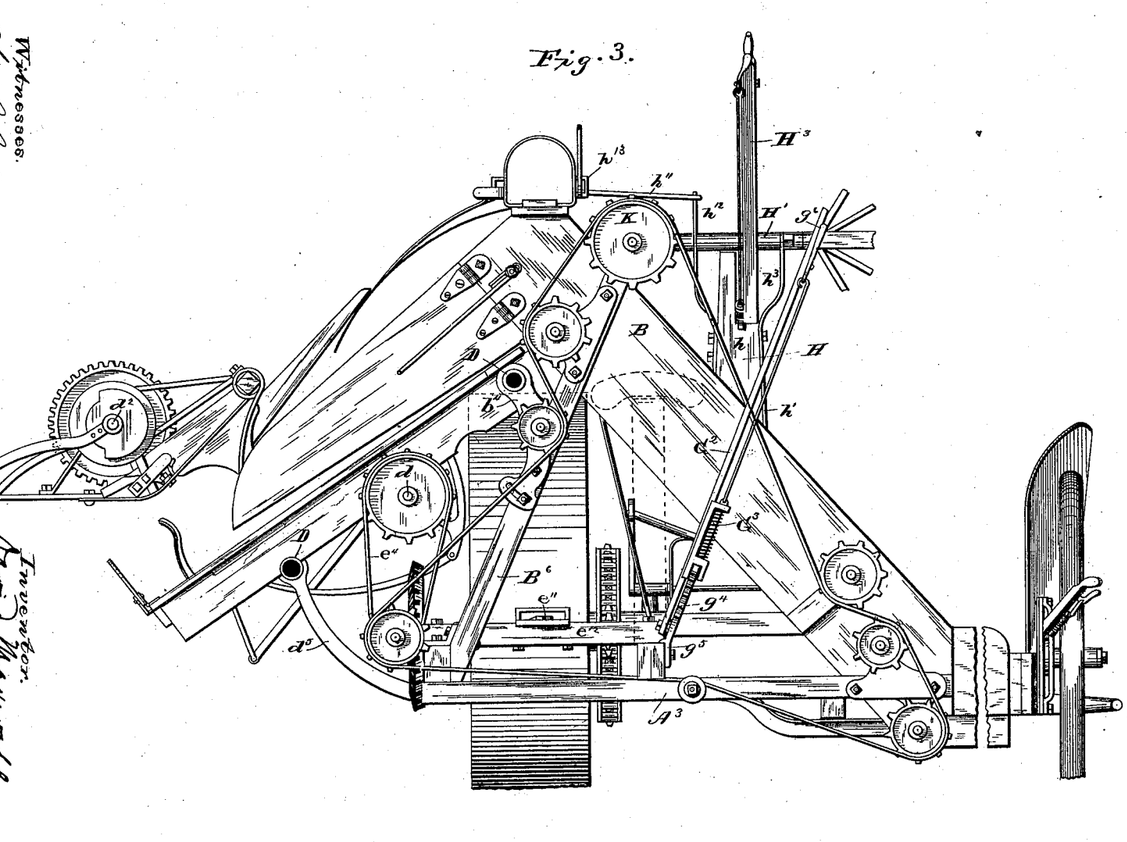
Figure 4:
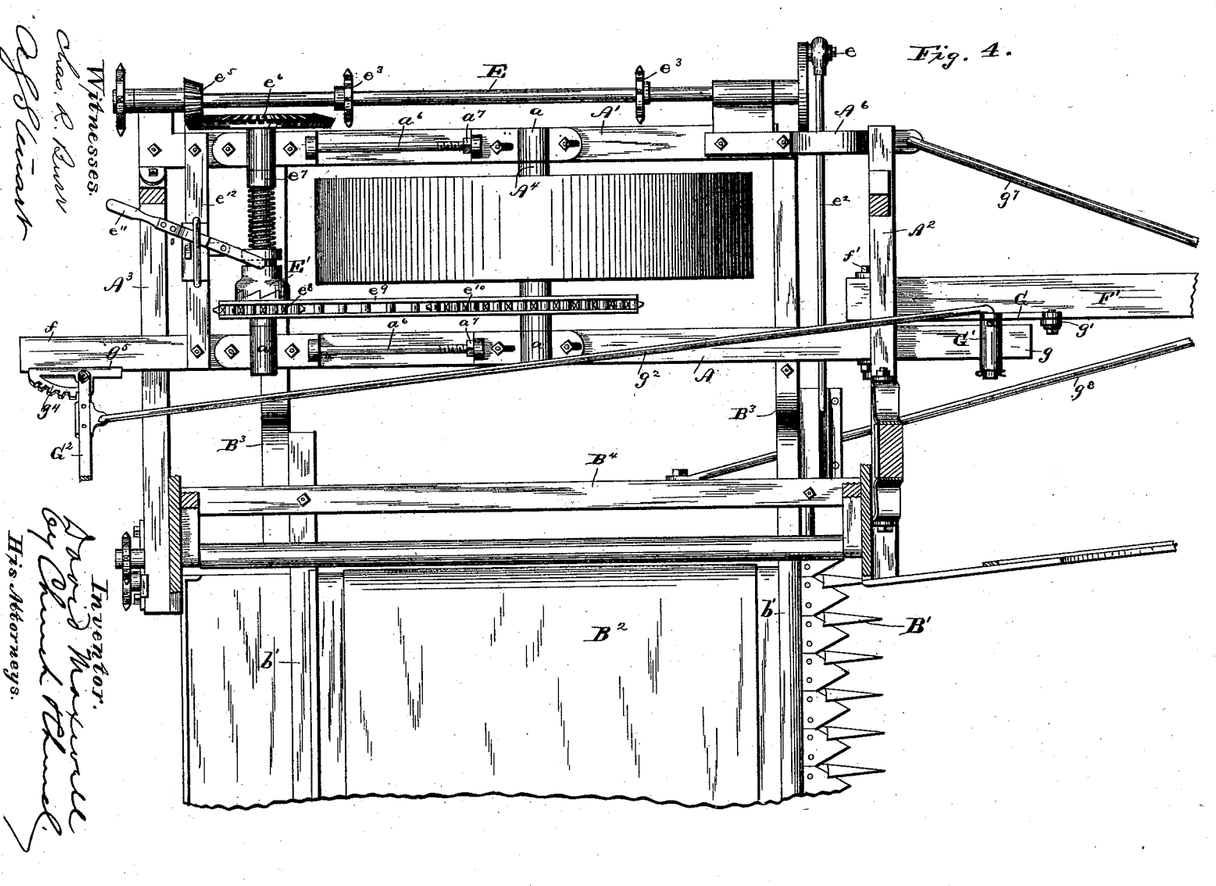
Fig. 4 is a top plan view of the main frame or truck with the platform, elevator-frame, and binding mechanism broken away.
Figures 5, 6, 7:
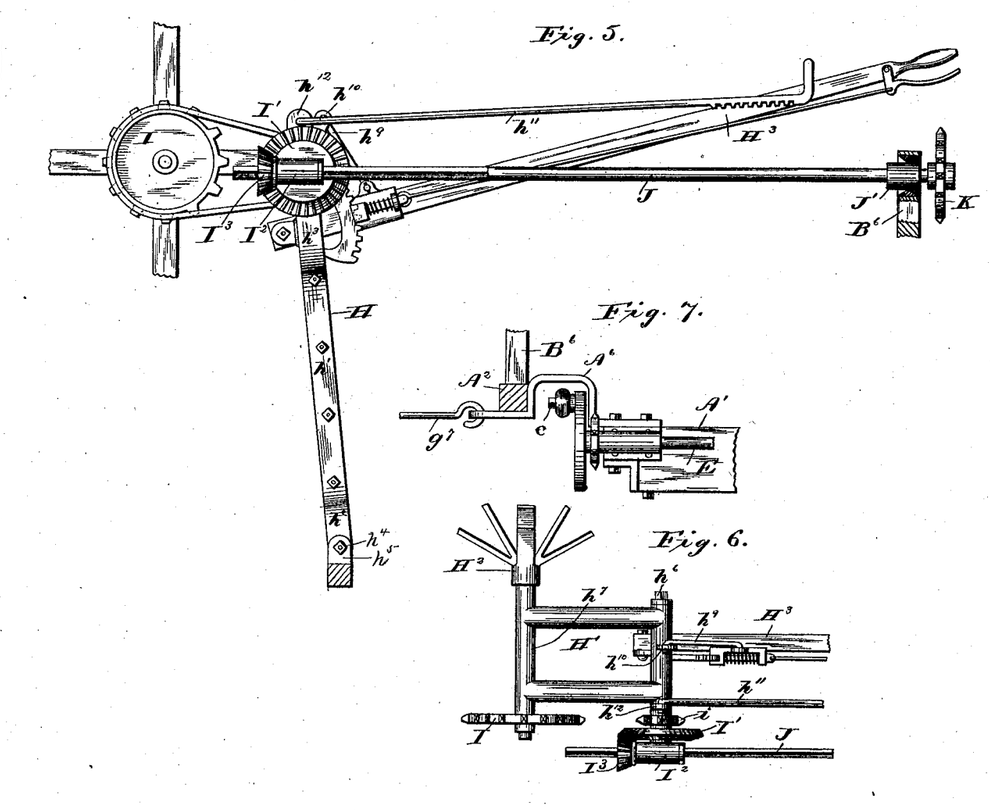
Figs. 5 and 6, detached views of the devices for supporting and actuating the reel.
Fig. 7 is a detail illustrating the connection between the ends of the outer rail or timber and the front cross-piece of the main frame to accommodate the pitman.
Figures 8, 9:
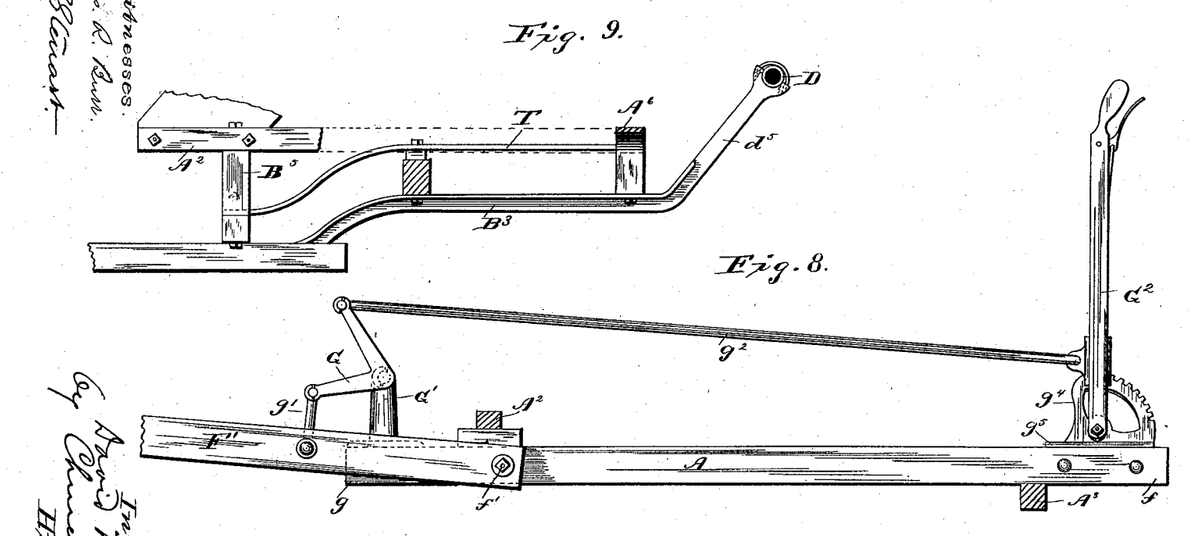
Fig. 8 is a detached view of the tilting devices.
Fig. 9 is a front view of a portion of the main frame with the front bar removed.

In harvesting-machines as usually constructed it is customary to mount and support the various mechanisms upon a single main frame or truck carrying the axle of the driving-wheel, and in order to retain the several devices in their proper relative positions the said main frame or truck is usually made comparatively large and heavy, so as to resist the strains to which it is subjected when the machine is in motion. These strains, which operate to twist and distort the frame and disturb the relative arrangement of the operating mechanisms, result not alone from the movements of the machine, but also from the defective manner in which the weight is disposed and applied to the main frame, and the disturbing influence is manifested in a much greater degree when, as in the present instance, the entire structure, including the platform and cutting mechanism, the elevating mechanisms, the reel, and the binding mechanism, are all mounted upon and secured to a single main frame or truck, which latter is supported and practically balanced upon a single main drive-wheel, from whence is derived the power for actuating the several mechanisms.

With a view to improving the general structure of the machine, I have designed a novel form and construction of main frame and applied the several mechanisms thereto in such a manner as to effectually prevent excessive distortion without unduly increasing the weight or size of the frame, producing a light and rigid frame-work whereon the several co-operating elements are maintained in their proper operating relation to each other and to the driver.

As shown in the drawings, the main frame or truck is composed, essentially, of the two longitudinal rails or timbers A and A' and the end or cross pieces, $A^2$ and $A^3$, forming a rectangular frame encompassing the main drive-wheel. The cross-piece $A^3$ passes beneath and is bolted to the rear ends of the longitudinal rails A A', while the cross-piece $A^2$ rests upon and is bolted to the forward end of the inner rail, A, and its outer end is in like manner secured to an arched bracket, $A^6$, fastened to the end, and forming an extension of the outer rail, A', for a purpose to be hereinafter described.

Upon the longitudinal rails A A' are mounted two boxes or bearings, $a\ a$, in which are secured the ends of the fixed axle $A^4$ of the main drive-wheel. These boxes $a\ a$ are each clamped fast to the rails, as by a bolt passing through a slot in the base or support of the boxes, and are provided with a collar or socket to receive the end of a brace-rod, $a^6$, upon whose threaded end is mounted a nut, $a^7$, bearing against the said collar or socket. These rods $a^6$ serve not only to brace and sustain the boxes in position on the rails, but also as a means for determining the position of the axle in effecting the necessary adjustment of the weight, and to take up slack in the driving chain extending back from the sprocket-wheel on the drive-wheel to the sprocket-pinion on the counter-shaft, through which motion is communicated to the various devices, as hereinafter described. It will be observed that by employing a stationary axle for the main drive-wheel and securing each end to one of the side rails it operates to supplement the action of the cross-pieces $A^2$ $A^3$ in maintaining and bracing the side rails in position. The end bars or cross-pieces $A^2$ $A^3$ of the main frame are continued beyond the rail A, to receive and support the lower end of the elevator-frame, whose front board is bolted to the cross-piece $A^2$ and the rear board to the cross-piece $A^3$, thereby throwing a portion of the weight of the elevator upon the cross-pieces at a point above the outer end of the platform and beyond the inner rail, A, of the main frame or truck. The platform $B^2$, carrying the finger-bar B', cutter-bar, and traveling apron of any well-known or approved construction, is provided with front and rear bars or sills, $b'$, running beneath and attached to the platform and connected at their outer ends by a longitudinal bar or timber, $B^4$, for a purpose to be described. The outer end of each bar or sill $b'$, or other convenient part of the platform, rests upon and is securely bolted to the inner end of a bent angle-iron bracket, $B^3$, extending beneath the longitudinal rails A A' of the main frame and securely bolted thereto, being located the one in front and the other in the rear, but close to the face of the main drive-wheel. These metal brackets $B^3$, preferably composed of angle-irons for strength, are bent or curved downward and inward at a point intermediate their point of attachment to the platform and main frame, so as to sustain the former parallel with but upon a lower plane than the longitudinal timbers or rails of the main frame to bring the cutters nearer the ground, and by carrying the outer ends of said supporting-brackets beneath and securing them to the rails A A' upon each side of the drive-wheel not only is the main frame strengthened thereby, but the connection between the platform and main frame is rendered more rigid and enduring.

In order to still further stiffen the connection between platform and main frame, and to give additional strength thereto, the outer longitudinal timber, $B^4$, of the platform is bolted at each end to the extended end of one of the cross-pieces $A^2$ $A^3$, a brace, $B^5$, being interposed between the cross piece $A^2$ and the front end of the timber $B^4$, to maintain the platform parallel with the main frame, (it being remembered that the cross-piece $A^2$ passes above and the cross-piece $A^3$ below the longitudinal timbers,) and to serve as a support for the reel-standard when mounted upon said cross-piece $A^2$, as will be presently explained. The upper end of the elevator-frame is connected to and supported upon the cross-pieces $A^2$ $A^3$ by diagonal bars or braces $B^6$, bolted to and extending downward and outward from the upper ends of the boards B to the outer ends of the said cross-pieces, as shown. By thus constructing and arranging the various parts which go to make up the elevator-platform and main frames said parts are conveniently adapted the one to the other, producing a light but strong and rigid frame-work upon which to mount the various operating mechanisms. The elevator-frame is supported almost entirely upon the end or cross-pieces of the main frame, while the platform is mainly supported by the longitudinal rails or timbers, the connection between the inner ends of the cross-pieces and outer end of the platform serving in a measure to unite these two systems of supports, and at the same time to maintain a more permanent and rigid structure.

The binding mechanism shown, and which, on account of its effectiveness, I prefer, is of the well-known "Appleby" type, provided with two or more packers driven from a shaft, $d$, a needle or binding arm mounted upon a shaft, $d'$, a knotting mechanism supported above the table and driven from a shaft, $d^2$, and a compressor-arm and trip mounted upon the rock-shaft $d^3$, all of said devices and their connecting and actuating mechanisms being mounted upon an independent movable or detachable frame applied to the harvester in the following manner: Beneath the binder-frame are secured two supporting-rods, D, the upper one passing through brackets $b^4$, attached to the diagonal braces $b^6$, while the lower one is mounted upon braces or brackets $d^5$, rising from and attached to the outer rail, A', of the main frame. These brackets $d^5$ may, if desired, be secured directly to the said outer rail; but it is preferred that they should be made as extensions or continuations of the brackets B³, which sustain the platform. As thus arranged, the weight of the binding mechanism, materially increased at times by the pull of the driving-chains and the quantity of grain delivered and held upon its table, instead of being applied directly to the timbers or rails of the main frame, where it would occasion violent strains tending to twist or distort the timbers or rails, is supported upon one end of the brackets B³, which latter carry upon their opposite or inner ends the platform, whereby the weight of the one is in a measure counterbalanced by that of the other, and their aggregate pressure is applied in a more nearly vertical direction upon the main frame, instead of each operating independently in a direction to twist and to distort the main frame. Although advantageous to thus support both ends of the binding mechanism upon extensions of the brackets B³, the rear end, which, being much the lighter, exerts less pressure, may, if desired, be supported upon a bracket, applied directly to the outer rail, A'.

As an additional safeguard to prevent the twisting or sagging of the outer rail, and to relieve the strain on the bolts by which the cross-piece A² is fastened beneath the longitudinal rails, and give greater rigidity to the main frame or truck, I apply a brace or truss rod, T, above, and secure it by bolts or otherwise to the rails A A', and continue it inward and downward to a point on the outer timber of the platform above the bracket B³, where it is securely fastened. The binding mechanism thus supported is arranged in close proximity to the drive-wheel, sufficient space being left between the binding-table, main frame, and the driving-wheel to accommodate the operating devices of the binder arranged beneath the said table, and in order to reduce the aggregate width of the machine and produce a more compact and practical arrangement of the parts the following improved arrangement of driving mechanism has been devised: Supported in bearings attached to the longitudinal timber A', and outside of the main frame, is located the crank-shaft E, for driving the cutter-bar. The front end of this shaft, carrying crank-pin $e$ on crank wheel or disk $e'$, stands slightly below the axle of the drive-wheel and opposite the arched bracket A⁶, uniting the outer end of the cross-piece A² to the forward end of the timber A', thereby bringing the crank-pin in line with the heel of the cutter-bar, so that the pitman $e^2$ may play across the end of the outer timber, A', and under the arched bracket A⁶, which latter is interposed at this point for the purpose of allowing the desired play of the pitman, and at the same time permit the shaft to be supported close to and against the outer timber, A', of the main frame without the necessity of either elevating the main frame, carrying the crank-shaft too low, or in a position to interfere with the movement of the binding mechanism, which latter is driven from said crank-shaft through the sprocket-wheels $e^3$, chains $e^4$, and sprocket-wheels applied to the shaft $d$ of the packer. The rear end of the crank-shaft E is provided with a bevel-pinion, $e^5$, gearing with a bevel-wheel, $e^6$, on a counter-shaft, $e^7$, mounted in bearings on the main frame in rear of the driving-wheel. Said counter-shaft $e^7$ is provided at or near its inner end with a sprocket-pinion, $e^8$, and is driven through a chain, $e^9$, from a sprocket-wheel, $e^{10}$, secured to the main drive-wheel on the inner side of the latter. A clutch, E', is interposed between the sprocket-pinion $e^8$ and the counter-shaft $e^7$, and the shipper $e^{11}$, pivoted to a cross-piece, $e^{12}$, (the latter serving also as a foot-rest,) projects rearwardly from the main frame and in convenient position to be operated by the foot of the driver when in his seat. The driver's seat F, located in rear of the elevator-frame, is supported upon and rises above an extension or continuation, $f$, of the inner longitudinal rail, A, so that the driver's weight is applied directly to the timbers of the main frame and in position to operate as a partial counterbalance to the heavier portion of the machine resting in front of the axle. The tongue F' is also connected to this inner timber, A, by a bolt, $f'$, forming a pivotal connection or joint located slightly in advance of the cutter-bar, so that the end of the tongue will not interfere with the pitman, which latter vibrates in rear of the tongue.

The tilting mechanism employed consists, essentially, of a bell-crank lever, G, pivoted in a post or bracket, G', rising from the forward extension, $g$, of the inner rail or timber, A, one arm of said lever being connected to the tongue by a link, $g'$, and the other arm by a rod, $g^2$, extending back under the elevator and between it and the wheel. The rear end of the rod or connection $g^2$ is pivotally secured to a hand-lever, $G^2$, fulcrumed on the rear extension, $f$, of the inner rail or timber, A. This hand-lever $G^2$ is carried up so as to be within easy reach of the driver when in his seat, and is provided with a locking device—such as a spring-actuated bolt, $G^3$—carried by the lever and in position to engage the notched segment $g^4$, formed on the bracket $g^5$, in which the lever is pivoted. A lever or latch, $g^6$, connected to the bolt $g^3$, is pivoted to the hand-lever at or near its outer end in the usual manner for actuating the bolt, so that the driver may at will unlock the lever and through the connections with the tongue tilt the machine, and thus elevate or depress the finger-bar.

The combination and arrangement of the tilting devices, more especially in its application to a harvester-binder of the kind described, possess certain marked advantages. It is simple, and in practice has proved a very useful and efficient adjunct to the machine. The lever is conveniently located near the right hand of the driver, who occupies a position most favorable for observing the working of the various parts of the machine. By passing the rod or connection uniting the hand-lever to the devices for changing the angle of the tongue relative to the frame beneath the elevator not only is a direct connection secured, but the adjusting devices are isolated from the other operating parts, avoiding the necessity of adapting one part to another in location and arrangement.

In order to strengthen the connection between the tongue and main frame and distribute the draft over a larger area two brace-rods, $g^7$ and $g^8$, are applied to the tongue by a bolt, $g^9$, the rod $g^7$ extending backward and outward to the end of the arched bracket $A^6$, to which it is flexibly attached at a point slightly above the bolt securing the tongue to the rail A, while the other rod or brace, $g^8$, is secured upon a bolt attached to the outer rail of the platform at a point in rear of and below the tongue-bolt. The rear ends of the brace-rods are attached to the frame, the one above and the other proportionally beneath the axis of the bolt, by which the tongue is secured to the rail A, with a view of diminishing rather than entirely avoiding the lateral movement of the tongue when the machine is tilted. To prevent the described deflection of the tongue in tilting the machine, it would only be necessary to apply the rear ends of the brace-rods to the main frame on a line with the axis of the tongue-joint; but this could not conveniently be done without disturbing the relation of other parts or by narrowing the base of the flexible connection formed by the tongue-bolt and the two braces, or by attaching the inner brace to the frame at a more advanced and disadvantageous point. According to my present arrangement, contemplating the use of two braces the better to equalize the draft, the outer brace is pivoted to the frame at proportionally the same distance above the axis of the tongue-bolt as the inner brace is below said axis, due allowance being made for the difference in length of the two rods, the inner brace being extended back and connected to the outer end of the platform. When, now, the tongue is vibrated to tilt the machine, the points of attachment at the opposite ends of one rod will be caused to approach in the same degree as those on the opposite rod are separated, and the lateral play of the tongue thus produced will be comparatively slight and distributed on opposite sides of the normal line in which the tongue is ordinarily carried. Moreover, the two braces will at all times be in operative connection on each side of the tongue to maintain the latter in its proper position relative to the frame of the machine.

The driver's seat being situated in rear of the elevator, it becomes necessary to so mount the reel and the mechanism for adjusting the same that they shall be at all times within the control of the driver, who, from his seat, is expected to tilt and thereby raise or lower the reel as occasion may require. With this end in view I have devised and constructed what I deem to be an improved combination of reel supporting, driving, and adjusting mechanism especially adapted for use in connection with the machine herein described, but also possessing advantages that would render it valuable as applied to certain other forms of harvesters. The reel support or standard H is pivotally secured to the laterally-projecting extension of the cross-piece $A^2$, which latter, being elevated above but secured to the outer end of the platform, affords a convenient base, and at the same time renders practicable the employment of a much shorter and consequently stronger and better reel standard. This standard H is preferably composed of a central portion or body, $h$, of wood, with metal side pieces or straps, $h'$, firmly bolted thereto, the upper and lower end of said side pieces being bent or spread apart, so as to form yokes $h^2 h^3$. The yoke $h^2$ is fastened by a bolt, $h^4$, to a bracket, $h^5$, in the cross-piece $A^2$.

Mounted upon a bolt, $h^6$, passing through the two arms of the yoke $h^3$, is a frame or casting, H′, provided with a box or bearing, $h^7$, parallel with the sleeve $h^8$, surrounding the bolt $h^6$, to receive the axis or journal of the reel-head $H^2$. A hand-lever, $H^3$, extending backward over the elevator and in position to be conveniently reached by the driver, is pivoted within the yoke $h^3$, and preferably to the side of the wooden portion $h$ of the reel-standard, and said lever is connected by a link, $h^9$, to an arm, $h^{10}$, formed upon or attached to the frame or casting H′. The hand-lever for actuating the frame or casting H′ to raise or lower the reel is thus connected by a link to an arm on the said frame or casting in order that the requisite extent of movement of the reel may be effected by a comparatively short throw of the hand-lever, for if the said lever were applied directly to the reel-supporting head its rear end, being extended back over the elevator, would have to be moved through such a long arc as to carry it beyond the reach of the driver when in his seat in rear of the elevator.

A sliding bolt and notched segment of the usual construction are applied to the hand-lever for holding the frame H' in adjusted position. These devices serve for elevating and depressing the reel, and the latter is thrown forward or backward at will through the medium of a rod or bar, $h^{11}$, connected at one end to the reel-standard, as to an extension, $h^{12}$, of one of the straps $h'$. The bar $h^{11}$, extending back over the elevator, may be provided with any suitable fastening device, such as a series of notches engaging one side of a guide, $h^{13}$.

Having thus provided a mechanism for conveniently adjusting and sustaining the reel in the desired position relative to the cutting devices and independent of such adjustment as is effected by the tilting of the frame, it next becomes desirable to provide an equally efficient driving mechanism for rotating the reel, and which shall accommodate itself to the various movements of the adjustable parts. To one end of the journal of the reel is secured a sprocket-wheel, I, which is in communication with a sprocket-pinion, $i$, turning loosely upon the bolt $h^6$, and secured to the driving-gear or bevel-wheel I'. Upon the outer end of this bolt $h^6$ is attached a box or bearing, $I^2$, standing substantially at right angles to said bolt and free to vibrate about the center of the driving-gear I'. Within this box is mounted a sleeve, $i'$, carrying a bevel-pinion, $I^3$, meshing with the drive-wheel I'. Extending above and across the elevator is the driving-shaft J, whose forward end is made angular to engage but slide freely within the pinion $I^3$, while the rear end of said shaft is mounted to oscillate freely within a bearing, J', supported upon a bracket or extension of the rear diagonal brace. The sprocket-wheel K, for communicating motion to the shaft J, is mounted upon the rear end of the latter near the bearing J'. When thus arranged and combined, the driving-shaft being free to vibrate in its rear bearings and its forward end being supported in the swivel-bearing on the axis of the driving-wheel, the head or frame carrying the reel or the reel-standard can either or both be vibrated upon their pivots without interfering with the action of the driving-shaft. This system of driving mechanism for the reel is regarded as more advantageous than one in which chains are employed for communicating motion directly to the reel-head, in that it dispenses with the multiplicity of parts and adjustments necessary to accommodate the chain and hold it in operative position during the adjustment of the reel. Moreover, by extending the driving-shaft above the elevator and applying the driving-gear in rear thereof not only is the weight better distributed on opposite sides of the axle, but the parts are so far removed from the grain and straw as to prevent entanglement.

Motion is communicated to the knotting mechanism of the binder from the packer-shaft through a chain, $k$, gearing with a sprocket-wheel, $k'$, on said shaft, and a similar wheel, $k^2$, attached to the part of the clutch $k^4$ on the shaft $k^3$. The pinion $k^5$ of the clutch, also mounted on the shaft $k^3$, gears directly upon the wheel $k^5$, fastened to the knotter-shaft.

Heretofore it has been customary to place the clutch and trip on the packer or other driving-shaft, with idler-wheels interposed between the pinion controlled by the trip and clutch and the gear on the knotter-shaft, thereby necessitating the formation of heavy bearings to support said idlers and requiring particular placing or adjustment of the said intermediate idler-wheels in order that the movements of the knotting mechanism should be timed to correspond with the release of the trip. It not infrequently happens that one or more of said idlers becomes broken or otherwise damaged, and unless the several parts were brought to the proper relative position when a new wheel is to be inserted the correct action of the binding mechanism could not be secured.

By placing the clutch-pinion and trip next the knotter-shaft, and connecting the former with the driving-shaft by a chain in the manner described, so long as the clutch and its gears remain intact there is no necessity for an accurate adjustment of the sprocket-wheels and chain, as the clutch is held by the trip-lever, and the knotting mechanism is set in action as soon as the compressor-arm is pushed back, no matter what may be the position of the packers at the time.

I claim as my invention—

1. In combination with the timbers A A' of the main frame or truck, the cross-pieces $A^2$ $A^3$, attached at their inner ends to the boards of the elevator-frame and to outer rail of the platform, and the bent or curved brackets secured to the said timbers A A' and to the platform, substantially as described.

2. In a harvester such as described, the combination of the main frame composed of the longitudinal rails and cross-pieces, the curved brackets applied to the said longitudinal rails and supporting the platform, and the truss rod or brace secured to the said rails and platform above the brackets, substantially as and for the purpose set forth.

3. In a harvester such as described, the combination of the main frame composed, essentially, of the longitudinal rails and cross-pieces applied thereto, the curved brackets supporting the platform, the elevator-frame applied to the extended cross-pieces, and the binder-frame supported upon the outward extension of the curved brackets, substantially as described.

4. The combination, in a one-wheel harvester-binder such as described, of the main frame or truck composed of the side timbers or rails, A A', and cross-pieces $A^2 A^3$, the platform and elevator mounted upon the cross-pieces, the curved brackets attached to the longitudinal rails A A' and the platform, the arched bracket between the end of the timber A' and cross-piece $A^2$, and the crank-shaft supported upon the outside of the main frame with its pitman projected across the end of the outer timber, A', substantially as described.

5. In a harvester-binder, the combination, with the main frame composed of the longitudinal rails or timbers A A' and the cross-pieces $A^2 A^3$, of the elevator-frame fastened at the bottom to the inner ends of the cross-pieces $A^2 A^3$, and at the top by diagonal braces to the outer ends of said cross-pieces of the curved brackets supporting the platform, and the binder-frame supported upon the diagonal braces at the upper end, and at the lower forward corner to a brace forming an extension of the front curved bracket, substantially as and for the purpose set forth.

6. In a harvester-binder such as described, and in combination with the longitudinal timbers of the main frame thereof, the curved brackets and cross-pieces $A^2 A^3$, secured to the longitudinal timbers of the main frame, and the platform secured to the curved brackets and to the inner ends of the cross-pieces, substantially as described.

7. The combination, in a harvester such as described, and with the main frame thereof, of the boxes $a$, adjustably secured to the longitudinal timbers of the main frame, the adjusting rods or braces $a^6$, engaging said boxes, the axle supported in the boxes, and the drive-wheel mounted upon said axle, substantially as described.

8. In combination with the main frame, the fixed axle, the longitudinally-adjustable bearings supporting said axle and secured to the longitudinal timbers of the main frame, the adjusting rods or braces engaging said bearings, the drive-wheel mounted loosely upon the axle and carrying the sprocket-wheel, the counter-shaft and its sprocket-wheel, and the chain connecting the said sprocket-wheels, substantially as described.

9. In combination with the longitudinal rails A A' and cross-pieces $A^2 A^3$, constituting the main frame, the arched bracket uniting the ends of the cross-piece $A^2$ and outer rail, A', the crank-shaft with its pitman projected across the end of the rail A', the tongue pivoted to the inner rail, A, in advance of the pitman and the brace extending from the tongue to the end of the said arched bracket, substantially as described.

10. The combination, to form a main frame or truck upon which to mount the elevating and binding mechanism of a harvester, of the longitudinal rails A A', the cross-pieces $A^2 A^3$, the arched bracket uniting the ends of the rail A' and cross-piece $A^2$, the fixed axle carrying the main drive-wheel and mounted in boxes applied to the longitudinal rails, the tongue pivoted to the forward extension of the inner rail, A, and the seat attached to the rear extension of said rail, the curved brackets extending beneath the longitudinal rails, and the platform supported upon the inner ends of said curved brackets and attached to the inner extensions of the cross-pieces $A^2 A^3$, substantially as described.

11. In a harvester such as described, and in combination with the main frame connected to the platform by the curved brackets and inner extensions of the cross-pieces $A^2 A^3$, the whole supported upon the grain-wheel and single main drive-wheel, the reel-standard mounted upon the cross-piece $A^2$ and above the outer end of the platform, substantially as described.

12. In a harvester such as described, and in combination with the main frame and platform connected by the curved brackets and inner extensions of the cross-pieces $A^2 A^3$ of the main frame, the reel-standard mounted upon the front cross-piece, $A^2$, and above the platform, and the tongue pivotally secured to the forward extension of the inner rail, A, of the main frame, substantially as described.

13. In a harvester-binder such as described, the combination, with the main frame having the extended cross-pieces and curved brackets, of the platform secured to both the extended cross-pieces and the curved brackets, the reel-standard supported upon the inner extension of the front cross-piece, and the elevator-frame secured at its lower end to the cross-pieces, substantially as described.

14. In a harvester such as described, and in combination with the main frame and platform thereof, the reel-standard pivotally mounted upon the inner extension of the cross-piece $A^2$, between the foot of the elevator-frame and the inner rail, A, of the main frame, substantially as described.

15. In a harvester-binder such as described, the combination, with the pivoted standard H, carrying the pivoted head H', of the reel mounted in said head, the sprocket-wheel on the reel-shaft, the sprocket-pinion on the axis of the pivot-bolt connecting the head H' to the standard H, bevel-gear I', also mounted on said pivot-bolt, socket $I^2$, carrying pinion $I^3$, and the driving-shaft J, passing through and engaging said pinion $I^3$, substantially as described.

16. In combination with the standard H and its yoke $h^2$, the frame or casting H', provided with a sleeve at one end for the reception of the reel and a sleeve or bearing at the other end for the reception of the bolt $h^6$, the latter passing through the arms of the yoke $h^3$, the transverse bearing $I^2$, mounted on the bolt $h^6$, the driving-shaft J, supported in said bearing $I^2$ and engaging the pinion $I^3$, bevel-wheel I', mounted upon an axis concentric with the bolt $h^6$, and gearing connecting said wheel I' and reel-shaft, substantially as described.

17. The combination, with the standard H, yoke $h^3$, head H', pivoted in said yoke and carrying the reel, of the driving-shaft and gearing mounted upon the pivot connecting the said casting and standard, the arm $h^{10}$, secured to the casting, the lever $H^3$, fulcrumed on the standard, and the link $h^9$, connecting the said lever and arm $h^{10}$, substantially as described.

18. In a harvester such as described, the combination, with the main frame composed of the longitudinal timbers A A' and cross-pieces $A^2 A^3$, of the curved brackets $B^3$, secured to both timbers A A', and the platform resting upon the inner ends of said brackets and secured to the latter and to the ends of the cross-pieces $A^2 A^3$, substantially as described.

DAVID MAXWELL.

Witnesses:
E. M. GAMBLE,
W. MILLS.